US011403896B2

(12) United States Patent
Gaufin et al.

(10) Patent No.: US 11,403,896 B2
(45) Date of Patent: Aug. 2, 2022

(54) WHEEL END COMPONENT MONITORING SYSTEM AND METHOD

(71) Applicant: Marmon Highway Technologies LLC, Jasper, AL (US)

(72) Inventors: Carl Gaufin, Madison, AL (US); Will Drake, Cullman, AL (US)

(73) Assignee: Marmon Highway Technologies LLC, Jasper, AL (US)

( * ) Notice: Subject to any disclaimer, the term of this patent is extended or adjusted under 35 U.S.C. 154(b) by 496 days.

(21) Appl. No.: 16/452,092

(22) Filed: Jun. 25, 2019

(65) Prior Publication Data

US 2020/0005558 A1    Jan. 2, 2020

Related U.S. Application Data

(60) Provisional application No. 62/692,396, filed on Jun. 29, 2018.

(51) Int. Cl.
*G01M 17/013* (2006.01)
*G07C 5/08* (2006.01)
*B60T 17/22* (2006.01)

(52) U.S. Cl.
CPC ............ *G07C 5/085* (2013.01); *B60T 17/221* (2013.01); *G01M 17/013* (2013.01)

(58) Field of Classification Search
CPC ...... G07C 5/085; G07C 5/008; G07C 5/0841; B60T 17/221; G01M 17/013; G01M 17/007
See application file for complete search history.

(56) References Cited

U.S. PATENT DOCUMENTS 5,838,229 A * 11/1998 Robinson, III ..... B60C 23/0472
340/442
6,011,463 A * 1/2000 Cormier, Sr. ....... B60C 23/0433
340/442

(Continued)

FOREIGN PATENT DOCUMENTS

WO    2014143624 A1    9/2014

OTHER PUBLICATIONS

International Preliminary Report on Patentability issued by ISA/EPO in connection with PCT/US2019/039270 dated Dec. 29, 2020.

(Continued)

*Primary Examiner* — Freddie Kirkland, III
(74) *Attorney, Agent, or Firm* — Levenfeld Pearlstein, LLC

(57) ABSTRACT

A wheel end component monitoring system includes at least one wheel end component and an aggregator system operably connected to the at least one wheel end component. The wheel end component includes a component body and a sensor assembly configured to detect an input associated with the component body, output sensor data representative of the detected input, and transmit the sensor data. The aggregator system is configured to receive position information for the wheel end component from a user interface, receive identification information for the wheel end component from the wheel end component, associate the position information with the identification information for the wheel end component, receive the sensor data from the wheel end component, associate the sensor data with the position information for the wheel end component, and output the sensor data together with the associated position information for the wheel end component.

11 Claims, 10 Drawing Sheets

(56) References Cited

U.S. PATENT DOCUMENTS

| | | | |
|---|---|---|---|
| 6,278,363 B1 | 8/2001 | Bezek et al. | |
| 6,945,087 B2* | 9/2005 | Porter | B60C 23/0408 |
| | | | 73/1.57 |
| 6,978,196 B2* | 12/2005 | Albertus | B60C 23/0479 |
| | | | 701/29.6 |
| 8,390,474 B2* | 3/2013 | Yi | G07C 5/008 |
| | | | 340/870.02 |
| 8,483,908 B2* | 7/2013 | Carresjo | G06Q 10/063 |
| | | | 701/36 |
| 8,659,412 B2* | 2/2014 | Deniau | B60C 23/0408 |
| | | | 340/445 |
| 9,415,642 B2* | 8/2016 | Lefaure | B60C 23/0471 |
| 9,933,337 B2* | 4/2018 | White | B60C 23/00363 |
| 10,035,387 B2* | 7/2018 | Carresjo | G01L 27/00 |
| 10,408,709 B2* | 9/2019 | Kusumi | G01L 5/00 |
| 10,739,204 B1* | 8/2020 | Duryea | G07C 5/0825 |
| 2010/0274441 A1* | 10/2010 | Carresjo | B60C 23/0479 |
| | | | 701/31.4 |
| 2010/0274607 A1 | 10/2010 | Carresjo et al. | |
| 2011/0260884 A1 | 10/2011 | Yi et al. | |
| 2018/0095008 A1 | 4/2018 | Kusumi et al. | |

OTHER PUBLICATIONS

International Search Report and Written Opinion issued by ISA/EPO in connection with PCT/US2019/039270 dated Oct. 23, 2019.

* cited by examiner

FIG. 10
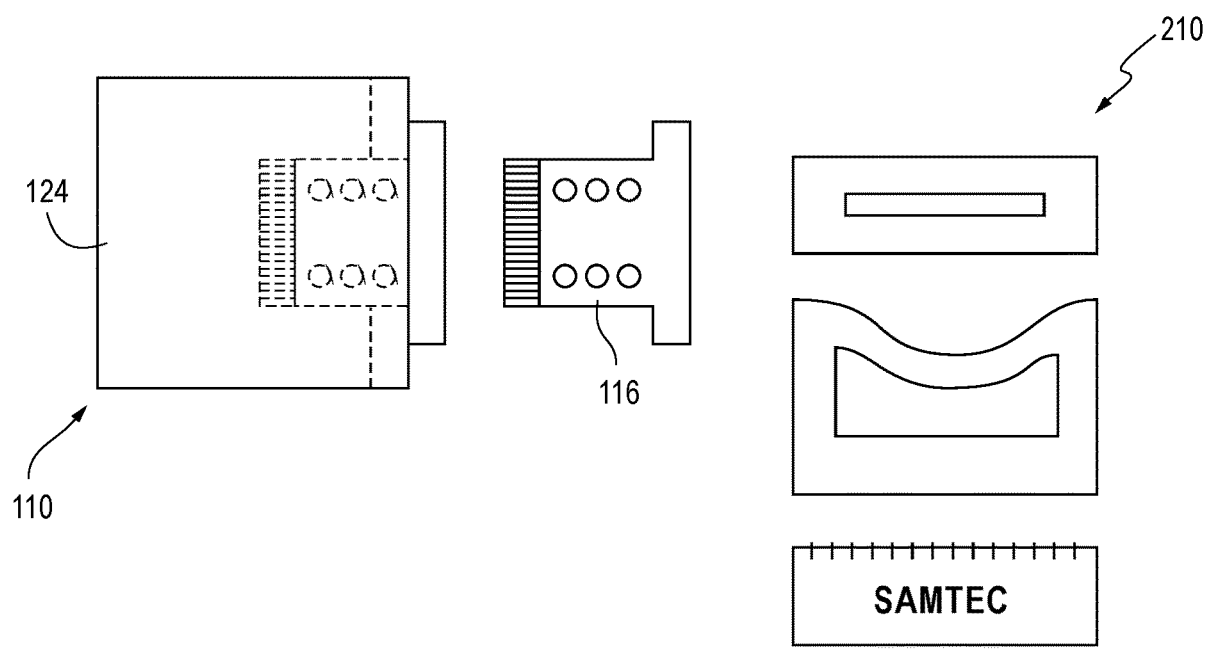
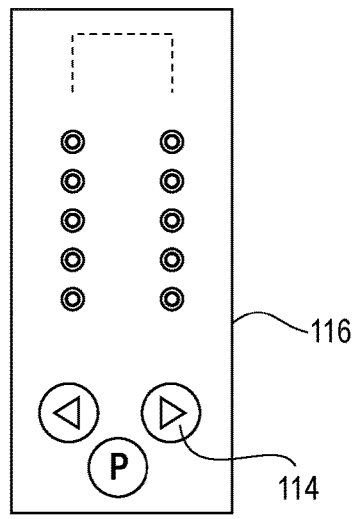

WHEEL END COMPONENT MONITORING SYSTEM AND METHOD

CROSS-REFERENCE TO RELATED APPLICATION DATA

This application claims the benefit of and priority to Provisional U.S. Patent Application Ser. No. 62/692,396, filed Jun. 29, 2018, titled WHEEL END COMPONENT MONITORING SYSTEM AND METHOD, the disclosure of which is incorporated herein in its entirety.

BACKGROUND

The present disclosure relates generally to a system and method for monitoring at least one wheel end component of a vehicle.

A commercial vehicle typically includes a plurality of wheel end components. In many instances, the wheel end components include more than one of the same type of component, each installed at a different position on the vehicle. For instance, a wheel hub may be installed at each wheel on the vehicle. In addition, a particular wheel end component is not always installed at a single, predetermined position (e.g., a particular wheel), but rather, may be installed at any suitable position (e.g., any of the wheels).

It is desirable to monitor a condition of the wheel end components so that the component may be properly maintained, repaired or replaced. To this end, a variety of sensors have been used to monitor different factors affecting the condition of wheel end components. The sensors transmit the detected data over a wired connection to a computer. A position of the wheel end component and the related sensor may be readily identified by way of the wired connection. Accordingly, a technician may quickly identify the component and its position to perform the necessary maintenance.

However, wired connections are frequently exposed to harsh environments during operation of the commercial vehicle. As a result, the wired connections may have a short service life and require frequent inspection, repair and/or replacement. In addition, as the wired connections wear, signal transmission may become unreliable. Further, installation of such wired connections may be time consuming and costly.

Wireless connections to facilitate wireless communications between sensors and the computer have been contemplated. However, over a wireless connection, it is difficult to determine the location of the sensor transmitting detected data. Thus, data detected by a sensor may be received indicating that a wheel end component requires service. However, the position of that wheel end component is not known. As such, a technician must inspect each wheel end component until the component requiring service is found.

Efforts have been made to address the above-noted drawbacks. For example, it has been contemplated that either mechanical switches or coding could be incorporated to determine a location of the wheel end component and related sensor. However, these techniques add complexity and cost to sensors.

Accordingly, it is desirable to provide a system and method for monitoring at least one wheel end component in such a manner that a position of the wheel end component on the vehicle is associated with sensor data received from the wheel end component.

SUMMARY

According to one embodiment, a wheel end component monitoring system includes at least one wheel end component and an aggregator system operably connected to the at least one wheel end component. The at least one wheel end component includes a component body and a sensor assembly configured to detect one or more inputs associated with the component body and output sensor data representative of the detected input, and transmit the sensor data. The aggregator system is configured to receive position information for the at least one wheel end component from a user interface, receive identification information for the at least one wheel end component from the at least one wheel end component, associate the position information with the identification information for the at least one wheel end component, receive the sensor data from the at least one wheel end component, associate the sensor data with the position information for the at least one wheel end component and output the sensor data together with the associated position information for the at least one wheel end component. In one embodiment, the at least one wheel end component and the aggregator system are wirelessly connected so as to communicate with one another over a wireless interface.

According to another aspect, a method of monitoring at least one wheel end component includes, in a commissioning step, receiving, in an aggregator system, position information for the at least one wheel end component, from a user interface of the aggregator system, receiving, in the aggregator system, identification information for the at least one wheel end component, from the at least one wheel end component and associating, in the aggregator system, the position information with the identification information. The method further includes, in an operating step, receiving, in the aggregator system, sensor data output by a sensor assembly of the at least one wheel end component, from the at least one wheel end component, associating, in the aggregator system, the sensor data with the position information corresponding to at least one wheel end component from which the sensor data was received, and outputting the sensor data together with the associated position information for the at least one wheel end component. In one embodiment, the at least one wheel end component and the aggregator system are wirelessly connected so as to communicate with one another over a wireless interface.

According to another aspect, a vehicle includes a vehicle frame, at least one wheel end component operably connected to the vehicle frame and an on-vehicle aggregator system operably connected to the at least one wheel end component. The wheel end component includes a component body and a sensor assembly configured to detect one or more inputs associated with the component body and output sensor data representative of the detected input and transmit the sensor data. The on-vehicle aggregator system is configured to receive position information for the at least one wheel end component from a user interface, receive identification information for the at least one wheel end component from the at least one wheel end component, associate the position information with the identification information for the at least one wheel end component, receive the sensor data from the at least one wheel end component, associate the sensor data with the position information for the at least one wheel end component, and output the sensor data together with the associated position information for the at least one wheel end component to determine a status of the wheel end component. In one embodiment, the at least one wheel end component and the on-vehicle aggregator system are wirelessly connected so as to communicate with one another over a wireless interface.

These and other features and advantages of the present invention will be apparent from the following detailed description, in conjunction with the appended claims.

BRIEF DESCRIPTION OF THE DRAWINGS

FIG. 10 shows an example of the aggregator system including a portable aggregator device and an aggregator base unit according to an embodiment.

DETAILED DESCRIPTION

While the present device is susceptible of embodiment in various forms, there is shown in the figures and will hereinafter be described a presently preferred embodiment with the understanding that the present disclosure is to be considered an exemplification of the device and is not intended to be limited to the specific embodiment illustrated.

Figure 1:
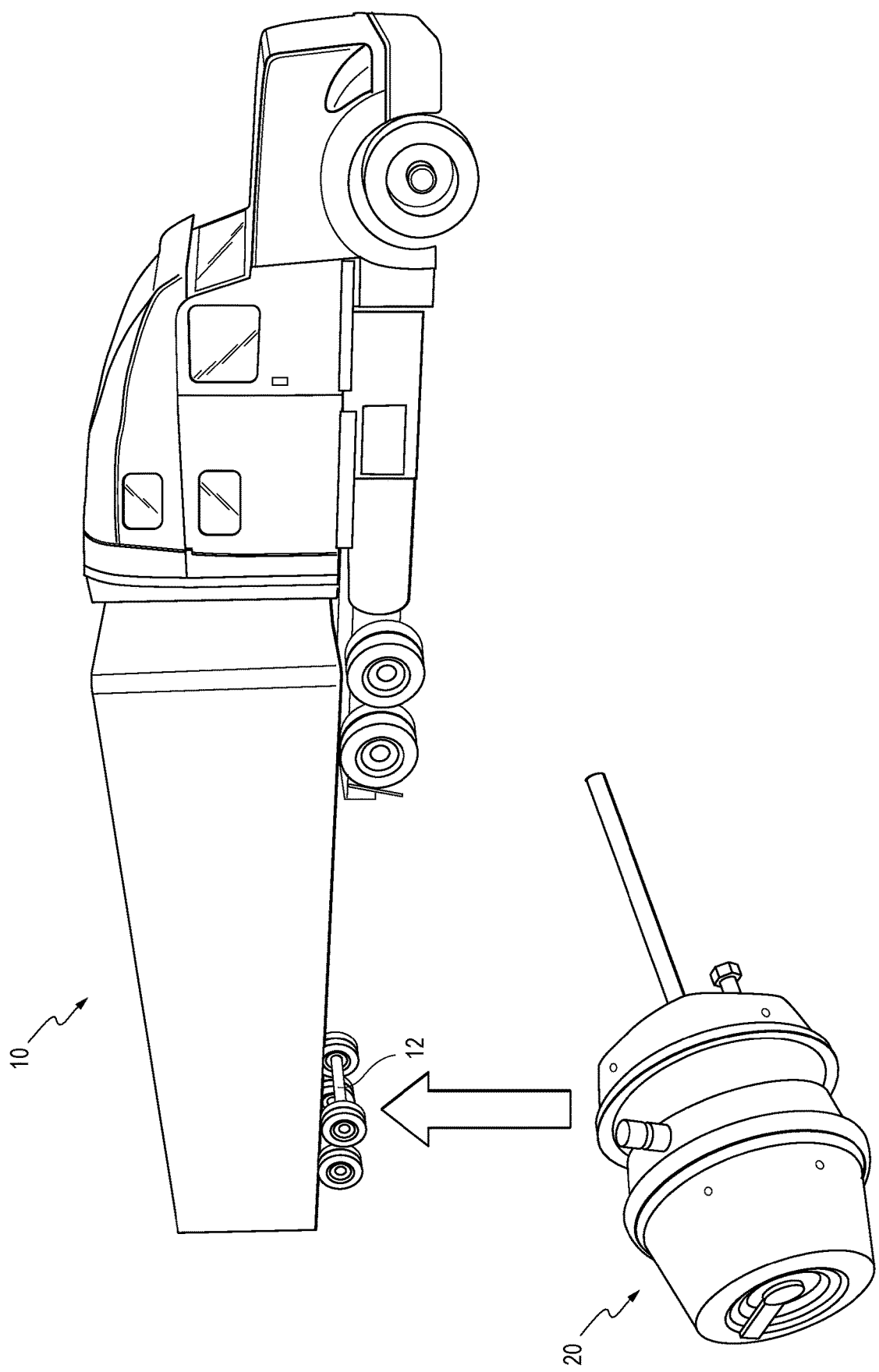
FIG. 1 shows, generally, a vehicle having at least one wheel end component according to an embodiment.
Figure 2:
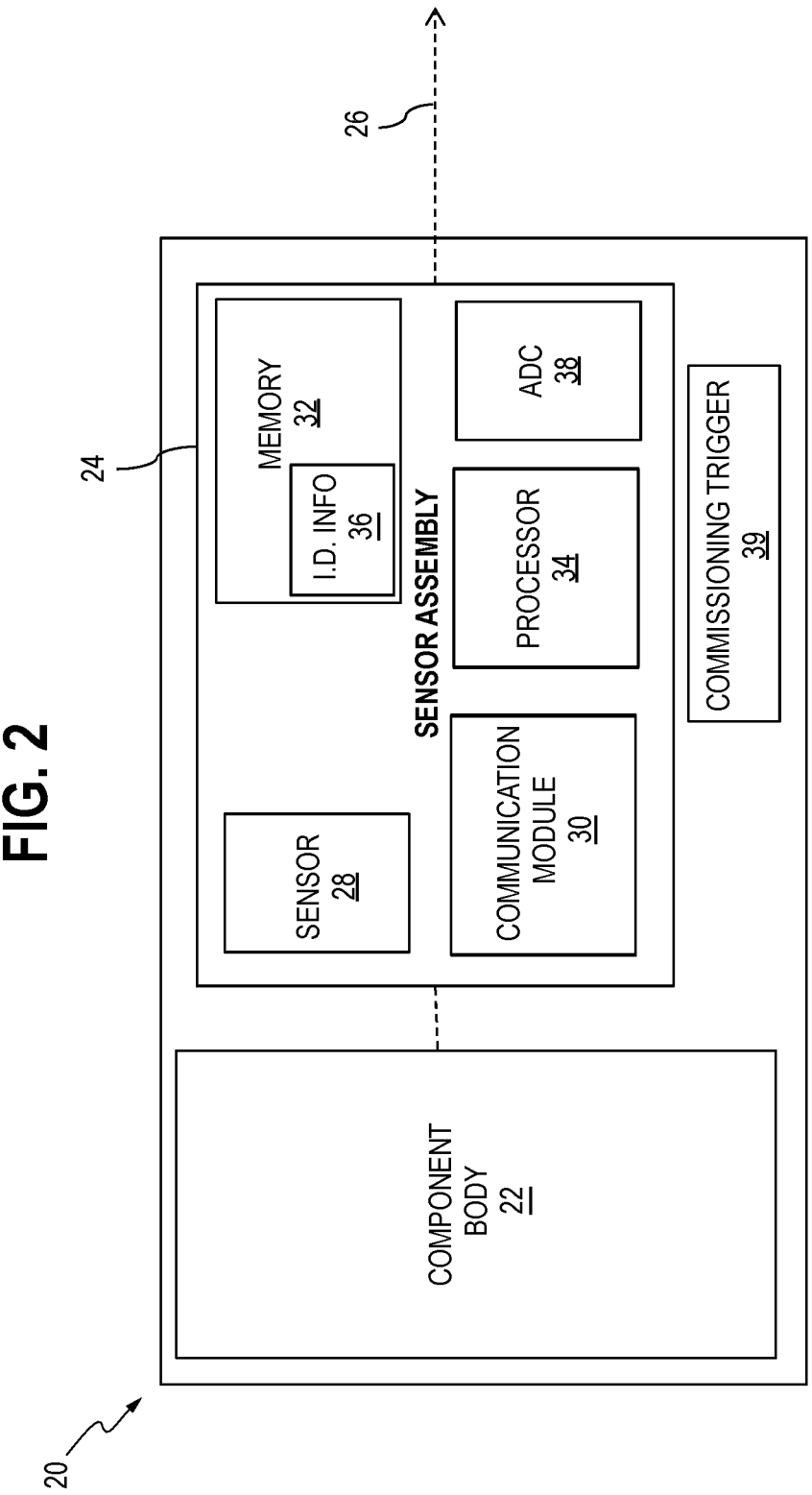
FIG. 2 is a schematic block diagram showing an example of the wheel end component of FIG. 1, according to an embodiment.

FIG. 1 shows an example of a vehicle 10, such as a commercial vehicle, which includes at least one wheel end component 20, and a frame 12 according to an embodiment. FIG. 2 is a schematic block diagram showing an example of the wheel end component 20, according to an embodiment. In one embodiment, the at least one wheel end component 20 includes a plurality of wheel end components. Referring to FIGS. 1 and 2, the wheel end component 20 generally includes a component body 22 and a sensor assembly 24. The component body 22 may be, for example, a brake actuator, a brake adjuster, a hub, a drum, a rotor, a brake caliper and the like. The present disclosure is not limited to these component bodies, however, and other known wheel end component bodies are envisioned in the systems and methods described herein. The sensor assembly 24 is configured to detect one or more inputs associated with the component body 22 and output sensor data 26 representative of the detected inputs. The sensor assembly 24 is also configured to transmit the sensor data 26.

Referring still to FIG. 2, the sensor assembly 24 includes a sensor 28 for detecting the one or more inputs and outputting the sensor data. The sensor assembly 24 may also include a communication module 30 for transmitting the sensor data 26. In one embodiment, the communication module 30 may be a radio module configured to transmit the sensor data 26 by broadcasting a radio signal containing the sensor data 26. In one embodiment, the communication module 30 may also be configured to receive a signal.

The sensor assembly 24 may further include a memory 32 and a processor 34, such as a microprocessor. The memory 32 stores program instructions to be executed by the processor 34. The memory 32 may also store identification information 36 for the wheel end component 20. In one embodiment, the identification information 36 is unique to the specific wheel end component 20. The memory 34 may also store the sensor data 26. The processor 34 is configured to execute program instructions stored in the memory 32 to carry out functions of the sensor assembly 24. For example, in response to executing program instructions, the processor 34 may control operation of the sensor 28 and the communication module 30. In one embodiment, the sensor assembly 24 may also include an analog-to-digital converter (ADC) 38 configured to convert analog sensor data output from the sensor 28 into digital sensor data. The wheel end component 20 further includes a commissioning trigger 39 operably connected to the sensor assembly 24 or integral with the sensor assembly 24.

The at least one input detected by the sensor assembly 24 may include any number of detectable inputs at a wheel end component as understood by those having skill in the art. For example, the one or more inputs may include, but are not limited to, a temperature, a number of cycles including a number of revolutions or strokes, a displacement, a stroke distance, a strain, a stress, a position or proximity of an object, moisture, dimensions, a current or voltage, a torque, a force, service time and the like.

Figure 3:
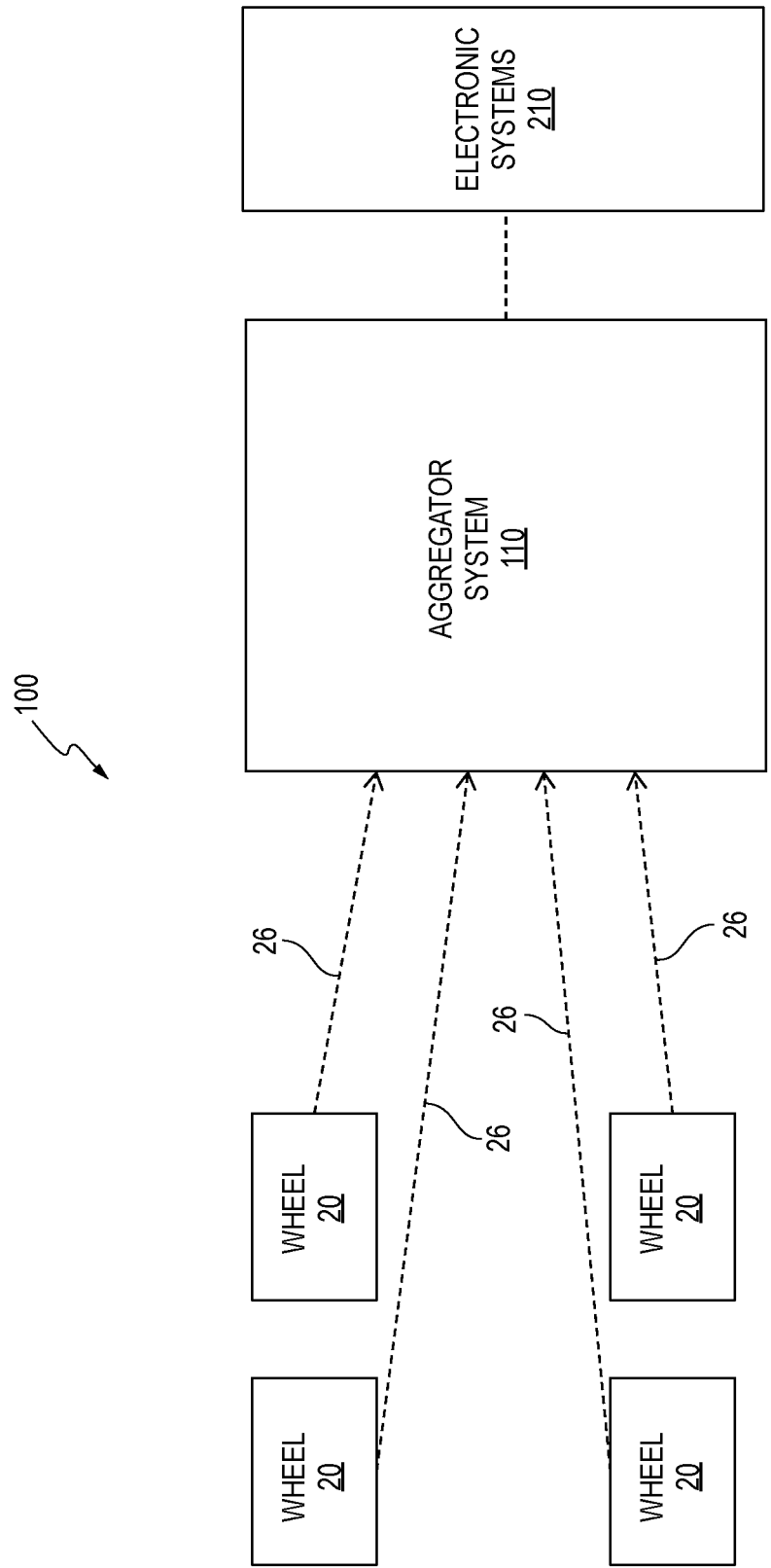
FIG. 3 is a schematic block diagram showing an example of a wheel end component monitoring system, according to an embodiment.

FIG. 3 is a schematic block diagram showing an example of a wheel end component monitoring system 100 according to an embodiment. Referring to FIG. 3, the wheel end component monitoring system 100 includes the at least one wheel end component 20 and an aggregator system 110 operably connected to the at least one wheel end component 20. In one embodiment, the at least one wheel end component 20 is operably connected to the aggregator system 110 by a wireless communication connection, such that the sensor data 26 may be wirelessly transmitted between the wheel end components 20 and the aggregator system 110.

In one embodiment, the wheel end component monitoring system 100 may also include a downstream electronics system 210 operably connected to the aggregator system 110. The downstream electronics system 210 may be a vehicle telematics system operably connected to the aggregator system 110 by a wired or wireless communication connection.

Figure 4:
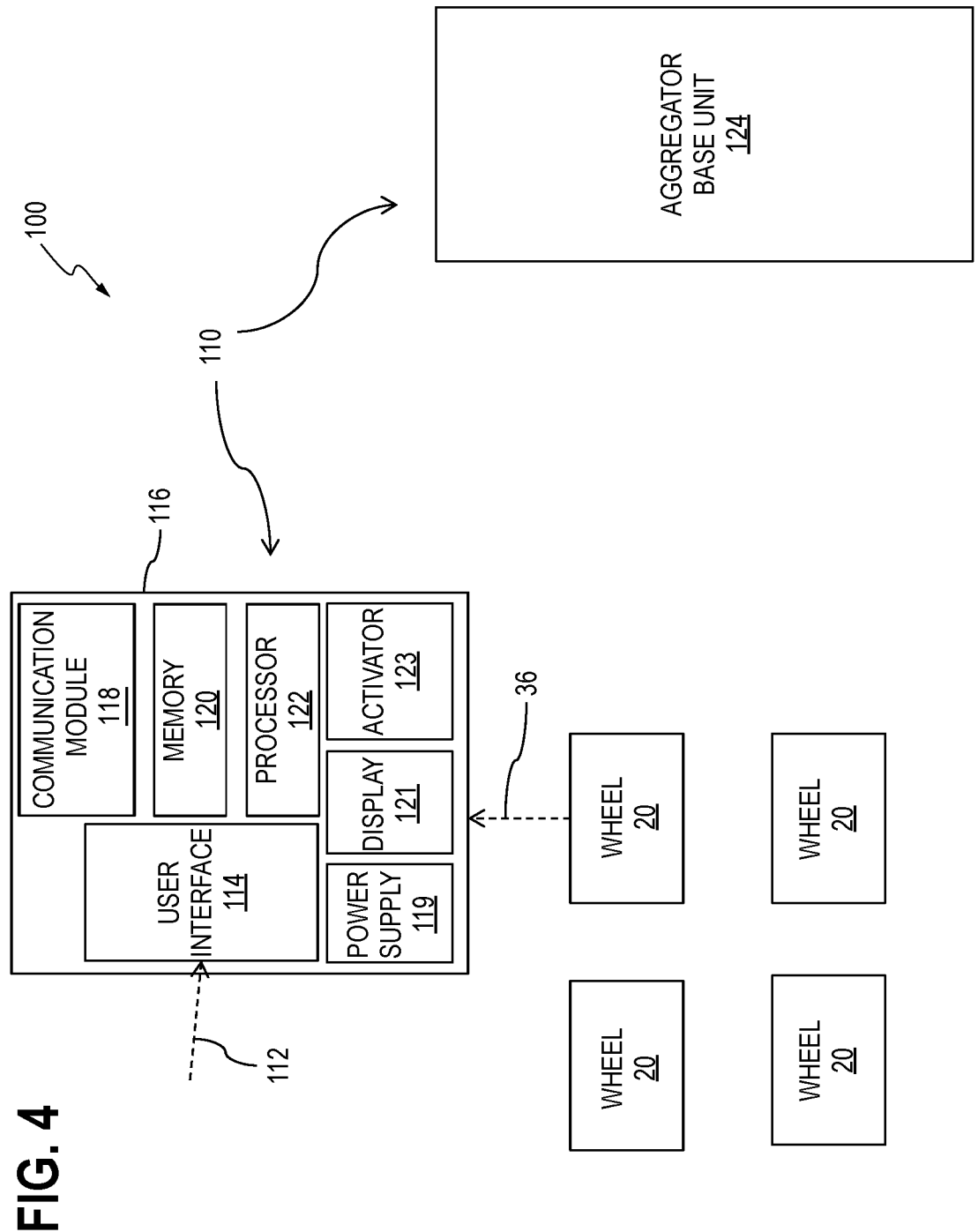
FIG. 4 is a schematic block diagram showing an example of wheel end component monitoring system in a commissioning step, according to an embodiment.

The wheel end component monitoring system 100 is operable in a commissioning stage and an operating stage. FIG. 4 is a schematic block diagram of the wheel end component monitoring system 100 in the commissioning stage, according an embodiment. The commissioning stage refers generally to a stage in which position information and identification information for each wheel end component 20 are received and associated, or linked together, as described below.

Referring to FIG. 4, the aggregator system 110 is configured to receive position information 112 for the at least one wheel end component 20 from a user interface 114 of the aggregator system 110. For example, in one embodiment, the aggregator system 110 includes a portable aggregator device 116 having the user interface 114. The portable aggregator device 116 also includes, for example, a communication module 118, a memory 120 for storing program instructions and a processor 122, such as a microprocessor, for executing the program instructions. The portable aggregator device 116 may further include a power supply 119, a display 121, and a commissioning activator 123. The user interface 114 may be, for example, a keypad, a number pad, a keyboard, any number of button, switches, keys, touch screen display which may be integrated with the display 121 and the like, or any combinations thereof.

In one embodiment, the position information 112 may be selected from the display 121. For example, the positions at which the wheel end components 20 may be installed are stored in the portable aggregator device 116. The positions may correspond to typical wheel positions on a vehicle, such as right rear, left rear, right front and left front. The technician may advance through the stored positions using the display 121, and select the desired position, i.e., the position of the wheel end component 20 the technician is seeking to commission. The selected position is then stored as the position information 112.

The aggregator system 110 is also configured to receive, from the wheel end component 20, the identification information 36 of the wheel end component 20. For example, the identification information 36 may be received by the portable aggregator device 116. In one embodiment, the identification information 36 is received in response to activation of a commissioning sequence.

To activate the commissioning sequence, the technician brings the portable aggregator device 116 into relatively close proximity of the wheel end component 20 to be commissioned. The technician may then operate the commissioning activator 123 of the portable aggregator device 116. The commissioning activator 123 may be operated, for example, by selection of a particular button, key, switch or other similar input device of the user interface 114. In one embodiment, the selection of the position of the wheel end component 20 may serve to operate the commissioning activator 123.

In one embodiment, the commissioning activator 123 activates the commissioning trigger 39 of the wheel end component 20. In response, the wheel end component 20 may then transmit the identification information 36 to the portable aggregator device 16. Thus, the commissioning trigger 39 may be activated wirelessly by way of an input entered at the portable aggregator device 116 when the device 116 is positioned within range of the commissioning trigger 39. Alternatively, or in addition, the commissioning trigger 39 may be activated by way of magnetic or mechanical techniques as well.

Accordingly, the aggregator system 110 may then store the identification information 36 and the position information 112 of the wheel end component 20. For example, the identification 36 and the position information 112 may be stored at the portable aggregator device 116 in the commissioning stage. Other information, in addition to the identification information 36, may be stored at the portable aggregator device 116 as well, such as relevant installation information or specific product or part information. For example, the installation date of the wheel end component 20 may be stored in the memory 120.

The aggregator system 110, for example, the portable aggregator device 116, may then associate the position information 112 with the identification information 36. In one embodiment, the position information 112 may be associated with the identification information 36, for example, by linking the position information 112 and the identification information 36 together in the memory 120.

Referring again to FIG. 3, in an operating stage, the aggregator system 110 is configured to receive the sensor data 26 from the sensor assembly 24 of the at least one wheel end component 20. The aggregator system 110 may then associate the sensor data 26 received from a particular wheel end component 20 with the position information 112 for that particular wheel end component 20. The aggregator system 110 may then output the sensor data 26 together with the associated position information 112 for each wheel end component 20, for example, to determine a status of the wheel end component 20. The sensor data 26 and the position information 112 may be associated with one another, for example, by linking and/or storing together in a memory of the aggregator system 110.

Figure 5:
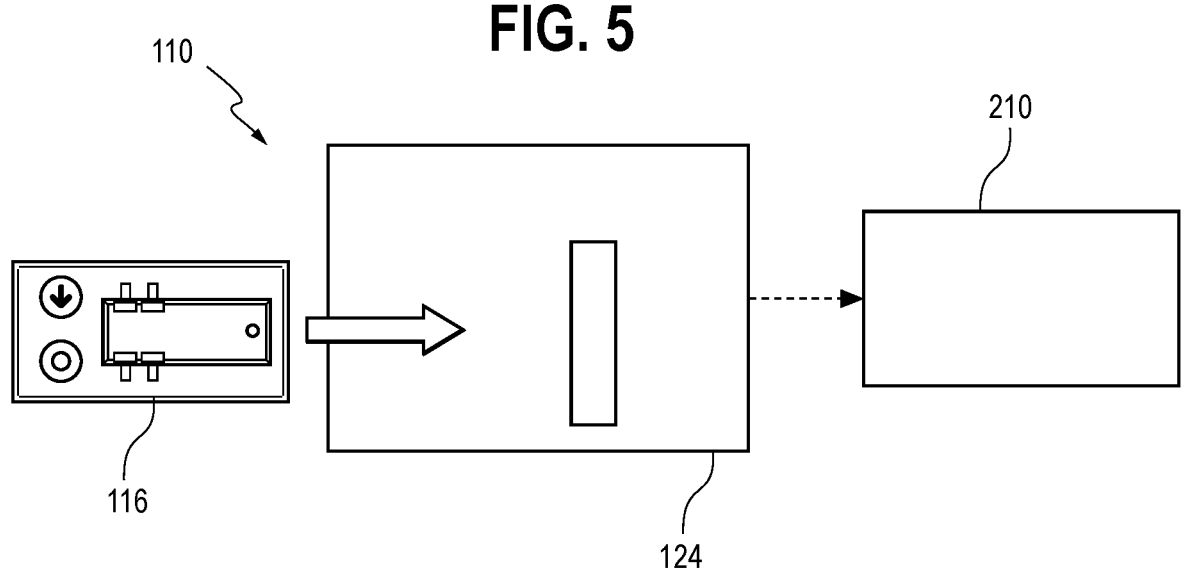
FIG. 5 is a diagram showing an aggregator system having a portable aggregator device detached from an aggregator base unit, according to an embodiment.
Figure 6:
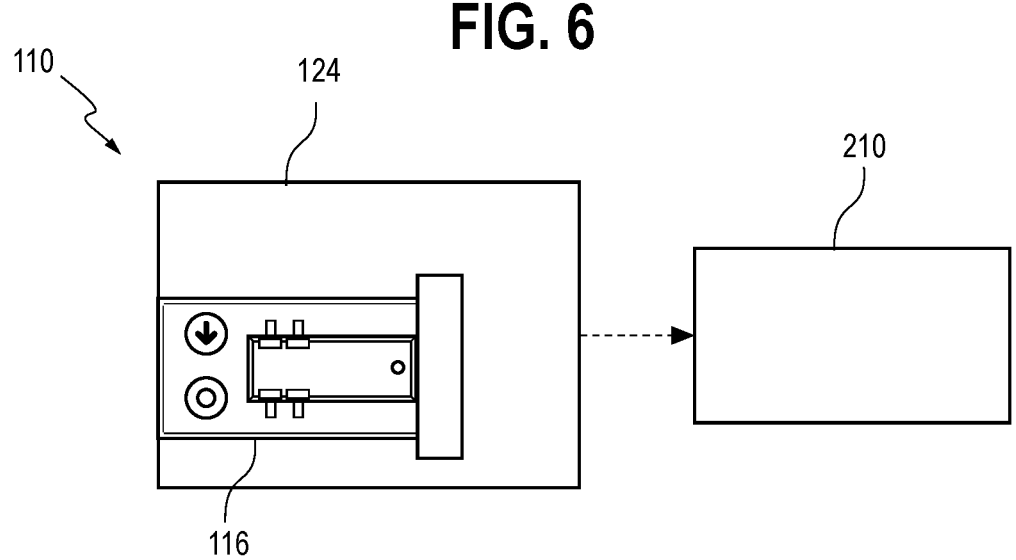
FIG. 6 is a diagram showing an aggregator system having the portable aggregator device attached to an aggregator base unit, according to an embodiment.

FIGS. 5 and 6 show diagrams of the aggregator system 110 according to an embodiment. Referring to FIGS. 4-6, the aggregator system 110 further includes an aggregator base unit 124. In one embodiment, the aggregator base unit 124 may be fixed to the frame 12 of the vehicle 10 (not shown in FIGS. 4-6). The portable aggregator device 116 is attachable to (FIG. 6) and detachable from (FIG. 5) the aggregator base unit 124. The portable aggregator device 116 is detached from the aggregator base unit 124 in the commissioning stage and is attached to the aggregator base unit 124 in the operating stage.

In one embodiment, the portable aggregator device 116 is operably connected to the aggregator base unit 124 in the operating stage through a communications interface. Thus, the aggregator base unit 124 may receive the position information 112 and associated identification information 36 (both acquired in the commissioning stage) for each wheel end component 20 from the portable aggregator device 116.

Figure 7:
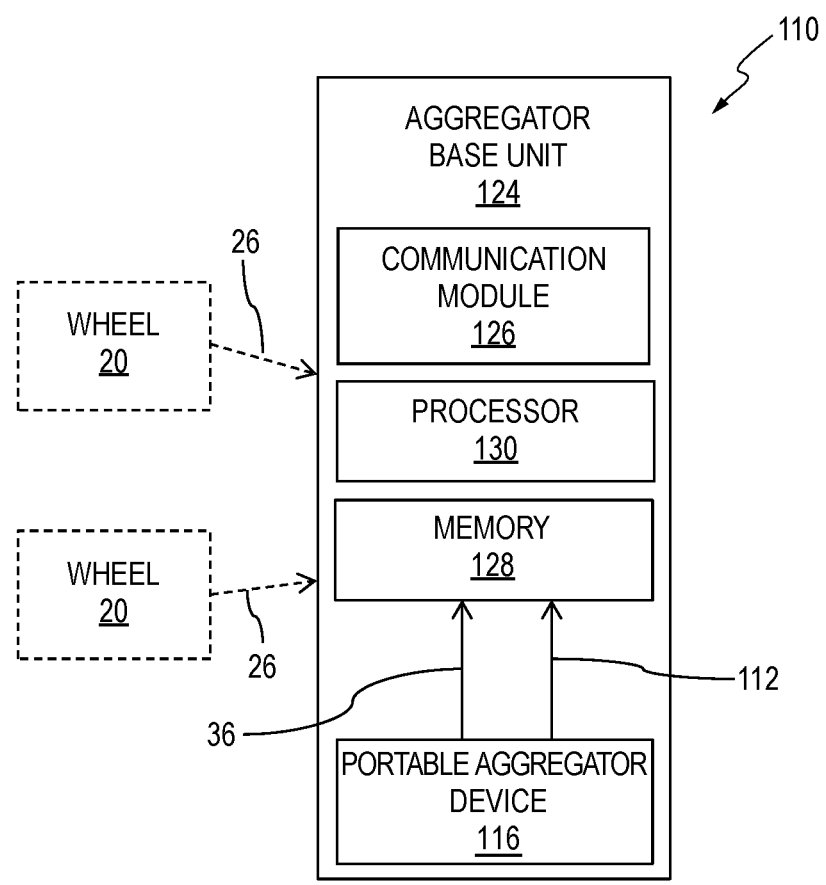
FIG. 7 is a schematic block diagram showing an example of the aggregator system according to an embodiment described herein.

FIG. 7 is a schematic block diagram showing an example of the aggregator base unit 124 according to an embodiment. Referring to FIG. 7, the aggregator base unit 124 may include a communication module 126, a memory 128 configured to store program instructions and a processor 130, such as a microprocessor, configured to execute the program instructions. The position information 112 and identification information 36 received from the portable aggregator device 116 may be stored in the memory 128.

In the operating stage, the aggregator base unit 124 is configured to receive the sensor data 26 from the at least one wheel end component 20. The aggregator base unit 124 may then associate the received sensor data 26 with the position information 112 for each wheel end component 20 to be monitored and output the sensor data 26 and associated position information 112.

In one embodiment, the sensor data 26 may also include the identification information 36 for the wheel end component 20 from which the sensor data 26 was transmitted. Thus, according to one example, the sensor data 26 may be associated to the position and identification information 36, 112 by comparing the identification information 36 received commissioning stage to the identification information 36 received with the sensor data 26, and associating the position information 112 to the sensor data 26 when the identification information 36 matches.

In another embodiment, the aggregator base unit 124 may be a physical storage component, such as a bracket, configured to releasably hold the portable aggregator unit 116 in place during the operating stage. In such an embodiment, the portable aggregator device 116 is configured to receive the sensor data 26 and associate the sensor data 26 with the position information 112 of the corresponding wheel end component 20, in the manner described above. The portable aggregator device 116 may also output the sensor 26 and the associated position information 112.

As shown in FIG. 3, the wheel end component monitoring system 100 may further include the downstream electronics system 210. The downstream electronics system 210 may be a vehicle telematics system. The downstream electronics system 210 is configured to analyze the sensor data 26 and determine a status of the at least one wheel end component 20 based on the sensor data 26. The status may include the position of the at least one wheel end component 20 based on the position information 112.

In one embodiment, the status may be output to a technician and/or a vehicle operator. The status may include, for example, a value of the input detected by the sensor assembly 24 at the at least one wheel end component 20 and the position of the at least one wheel end component 20. For instance, the status may indicate that a temperature of 100° C. has been detected at the right rear hub. Alternatively, or in addition, the status may indicate a fault or error in the wheel end component 20 for which the status was determined.

In another embodiment, it is envisioned that the aggregator system 110, for example, the portable aggregator device 116 or the aggregator base unit 124, may determine the status of the at least one wheel end component 20. In one embodiment, the aggregator system 110 and the downstream electronics system 210 may be an integrated unit.

In one embodiment, the downstream electronics system 210 of a plurality of vehicles may be operably connected to a centralized computer system, such that wheel end components 20 on a plurality of vehicles 10 may be centrally monitored. Accordingly, the status or condition of wheel end components 20 on a fleet of vehicles 10 may be monitored.

Figure 8:
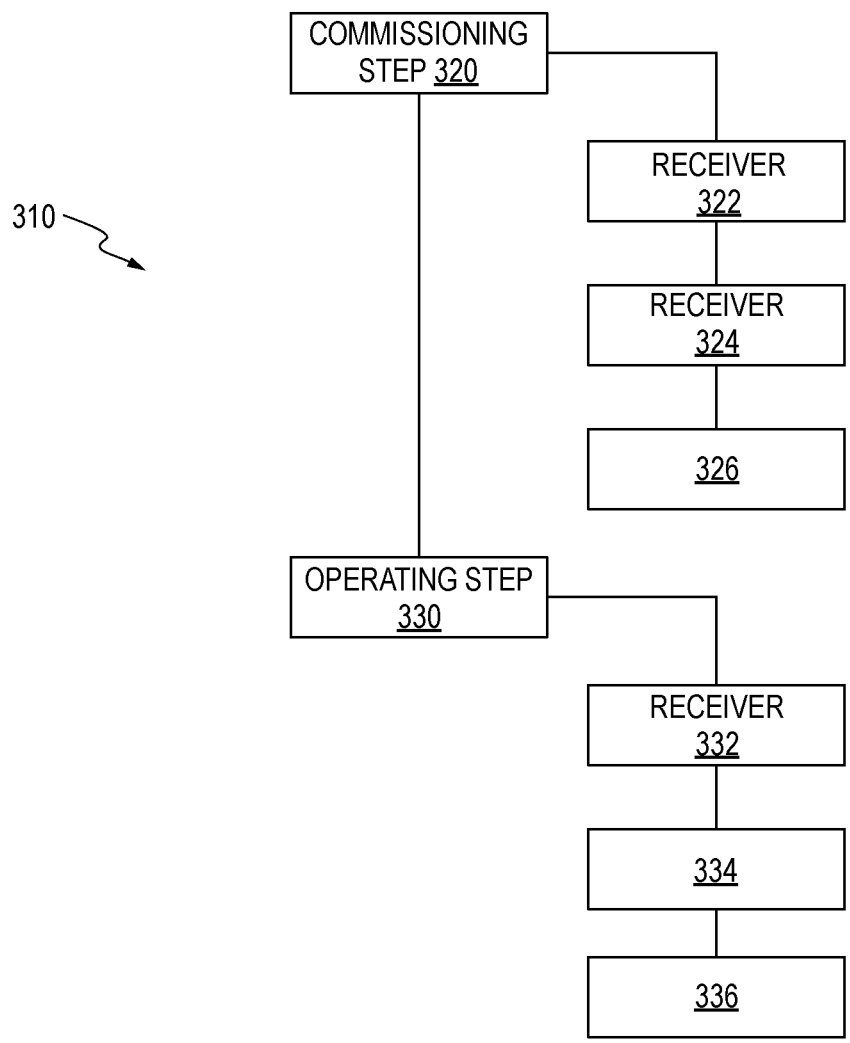
FIG. 8 is a block diagram of a method for monitoring at least one wheel end component, according to an embodiment.

With reference to FIG. 8, a method 310 of monitoring the at least one wheel end component 20, according to one embodiment, may generally include a commissioning step 320 and an operating step 330. In the commissioning step 320, the method includes receiving 322, at the aggregator system 110, the position information 112 for at least one wheel end component 20, receiving 324, in the aggregator system 110, identification information 36 for the at least one wheel end component 20, and associating 326, at the aggregator system 110, the position information 112 with the identification information 36.

The position information 112 is received through the user interface 114 of the portable aggregator device 116. The identification information 36 is also received in the portable aggregator device 116 from the at least one wheel end component 20, and may then be associated with the position information 112 to commission the wheel end component 20.

In the commissioning step 320, the portable aggregator device 116 may be freely movable relative to the at least one wheel end component 20. According to one embodiment, to carry out the commissioning step 320, the portable aggregator device 116 is positioned within range of the commissioning trigger 39 of particular wheel end component 20 to be commissioned. In response to activation of a commissioning sequence, commissioning trigger 39 causes the wheel end component 20 to transmit the identification information 36 to the portable aggregator device 116. The wheel end component 20 is then commissioned by associating the received identification information 36 with the position information 112.

In the operating step 330, the method may further include receiving 332, in the aggregator system 110, sensor data 26 output by the sensor assembly 24 of the at least one wheel end component 20, associating 334, in the aggregator system 110, the sensor data 26 and the position information 112 corresponding the at least one wheel end component 20 from which the sensor data 26 was received, and outputting 336 the sensor data 26 together with the associated position information 112 for the at least one wheel end component 20, for example, to determine a status of the at least one wheel end component 20.

In one embodiment, the portable aggregator device 116 is operably connected to the aggregator base unit 124 and transmits the position information 112 and associated identification information to the aggregator base unit 124 to be stored in the memory 128. The aggregator base unit 124 is configured to receive the sensor data 26 from the at least one wheel end component 20 and associate the sensor data 26 with the position information 112 for the at least one wheel end component. The aggregator base unit 124 may then output the sensor data 26 with the associated position information 112.

In one embodiment, a power supply to the portable aggregator device 116 may be disabled when the portable aggregator device 116 is connected to the aggregator base unit 124. In one embodiment, if the portable aggregator device 116 is not returned to the aggregator base unit 124, the aggregator base unit 124 may generate a fault code.

In another embodiment, the aggregator base unit 124 may be a physical storage component configured to releasably hold the portable aggregator device 116. In such an embodiment, the portable aggregator device 116 is configured to receive the sensor data 26 and associate the sensor data 26 with the position information 112 in the manner described above. The portable aggregator device 116 may then output the sensor data 26 together with the associated position information 112.

The sensor data 26 together with the position information 112 for each wheel end component 20 may be output to the downstream electronics system 210. The downstream electronics system 210 may then determine the status of the wheel end component 20 from which the sensor data 26 was received. The status includes the position of the wheel end component based on the associated position information 112.

The method 310 above may be carried for each wheel end component 20 of the plurality of wheel end components 20 for which monitoring is sought. Similarly, the system 100 described herein may include each wheel end component 20 for which monitoring is sought, and the various functions carried out by the system 100 may be carried out with respect to each wheel end component 20 for which monitoring is sought.

Figure 9:
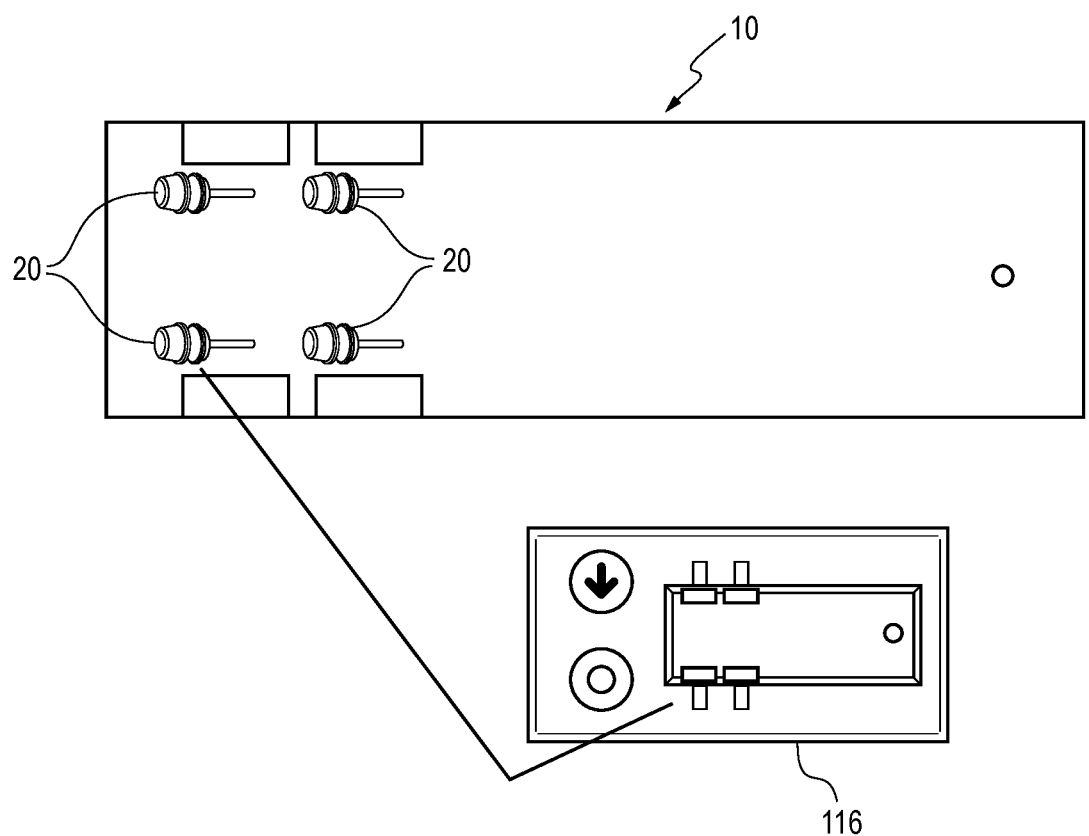
FIG. 9 is a diagram showing wheel end components on a vehicle, according to an embodiment.

Referring to FIGS. 1, 3-7 and 9, the vehicle 10 includes the wheel end component monitoring system 100. As shown in FIG. 9, for example, the vehicle 10, and in particular, a trailer of the vehicle 10, includes plurality of wheel end components 20 installed thereon. In one embodiment, the aggregator system 110 is mounted on the frame 12. For example, the aggregator base unit 124 may be mounted to the frame 12, and the portable aggregator device 116 may be selectively and removably attached to the aggregator base unit 124. In addition, the sensor assembly 24, or one or more sub-components of the sensor assembly 24, may be installed on the wheel end component body 22, or separately mounted on the vehicle frame 12 and operably connected to the wheel end component body 22.

The aggregator base unit 124 may be mounted on the vehicle 10 at a location remote from the at least one wheel end component 20. In one embodiment, the aggregator base unit 124 is operably connected to the wheel end component 20 over a wireless connection to receive the sensor data 26 from the wheel end component 20. In another embodiment, the portable aggregator device 116 may be attached to the aggregator base unit 124 and receive the sensor data 26 from the at least one wheel end component 20 over a wireless connection.

Accordingly, in the embodiments above, a plurality of wheel end components 20 may be monitored based on the sensor data 26, and the position the of the wheel end component 20 providing the sensor data 26 may be readily identified. In this manner, the technician need not inspect each wheel end component 20 until a condition or status indicated by the sensor data 26 is found. Moreover, the position information 112 may be obtained without the need for complex modifications to a sensor or sensor assembly.

FIG. 10 shows an example of the aggregator system 110 including a portable aggregator device 116 and an aggregator base unit 124 connected to a downstream electronics system 210, according to an embodiment. An example of a user interface 114 is shown on the portable aggregator device 116.

Figure 11:
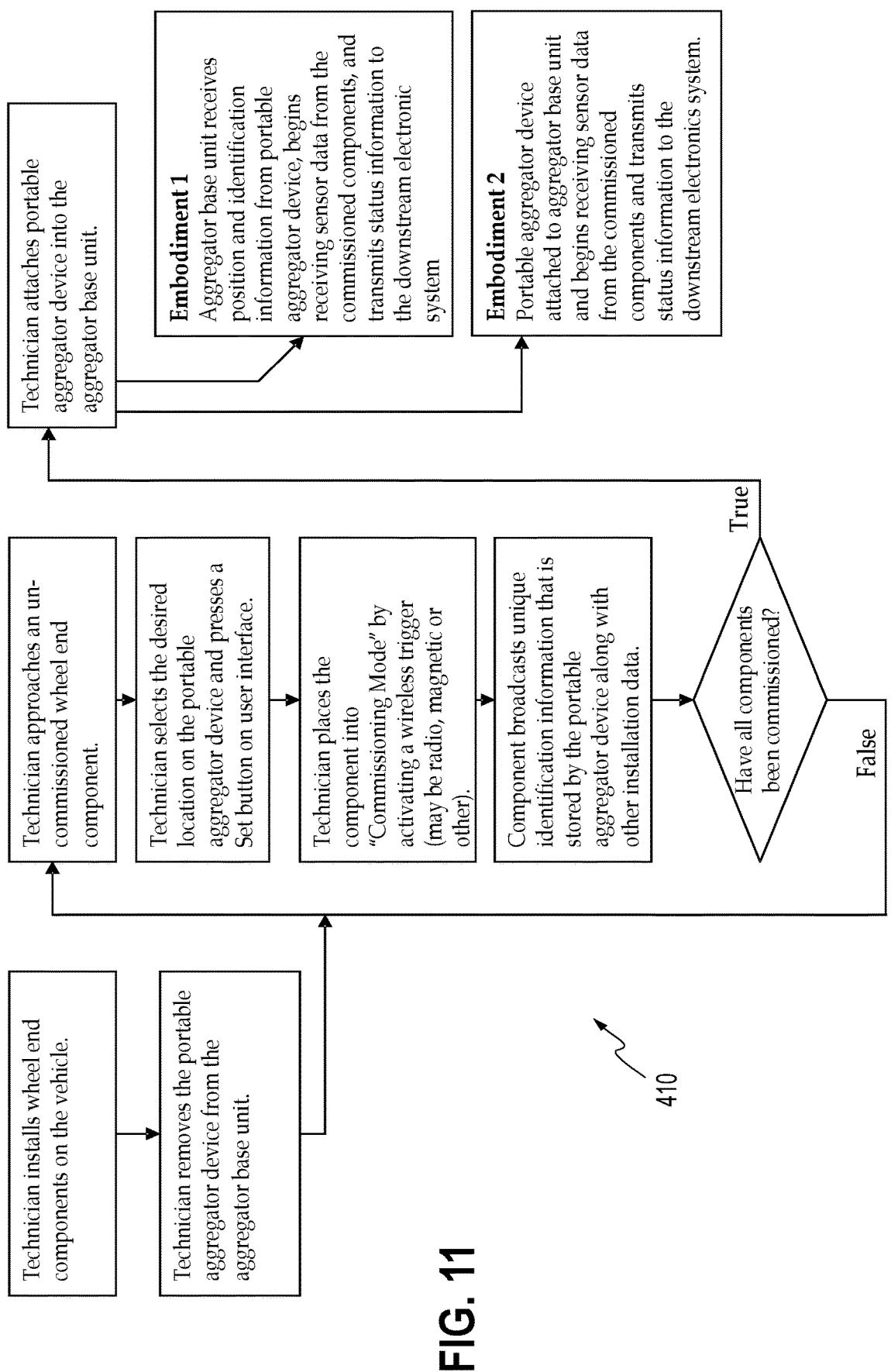
FIG. 11 is a diagram showing an example of a method for monitoring a wheel end component according to an embodiment.

FIG. 11 is a diagram showing an example of a method 410 for monitoring a wheel end component. The method 410, in one embodiment, includes the following steps: the technician installs wheel end components 20 on the vehicle 10; the technician removes the portable aggregator device 116 from the aggregator base unit 124; the technician approaches an un-commissioned wheel end component 20; the technician selects the desired location on the portable aggregator device 116 and presses a Set button on the user interface 114; the technician places the component 20 into "Commissioning Mode" by activating a wireless trigger (may be radio, magnetic or other); and the component 20 broadcasts a unique identifier message that is stored by the portable aggregator device 116 along with other installation data. It will be appreciated that additional wheel end components 20 may be commissioned by repeating some of the steps above. Once all desired components 20 are commissioned, the method 410 includes the following steps: the technician attaches the portable aggregator device 116 to the aggregator base unit 124; and either 1) the aggregator base unit 124 receives position and identification information 112, 36 from portable aggregator device 116, begins receiving sensor data 26 from the commissioned components 20, and transmits status information to the downstream electronics system 210; or 2) the portable aggregator device 116 is attached to aggregator base unit 124 and begins receiving sensor data 26 from the commissioned components 20 and transmits status information to the downstream electronics system 210.

Features from any one of the embodiments described above may be implemented in, combined or used together with, or replace features from any of the other embodiments described above.

It is understood the various features from any of the embodiments above are usable together with the other embodiments described herein.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular. In addition, it is understood that terminology referring to orientation of various components, such as "upper" or "lower" is used for the purposes of example only, and does not limit the subject matter of the present disclosure to a particular orientation.

From the foregoing it will be observed that numerous modifications and variations can be effectuated without departing from the true spirit and scope of the novel concepts of the present disclosure. It is to be understood that no limitation with respect to the specific embodiments illustrated is intended or should be inferred. The disclosure is intended to cover all such modifications as fall within the scope of the claims.

What is claimed is:

1. A wheel end component monitoring system comprising:
   at least one wheel end component comprising:
      a component body; and
      a sensor assembly configured to:
         detect one or more inputs associated with the component body and output sensor data representative of the detected input; and
         transmit the sensor data; and
   an aggregator system operably connected to the at least one wheel end component and configured to:
      receive position information for the at least one wheel end component from a user interface;
      receive identification information for the at least one wheel end component from the at least one wheel end component;
      associate the position information with the identification information for the at least one wheel end component;
      receive the sensor data from the at least one wheel end component;
      associate the sensor data with the position information for the at least one wheel end component; and
      output the sensor data together with the associated position information for the at least one wheel end component,
   wherein the aggregator system includes a portable aggregator device and a base aggregator unit,
   wherein the portable aggregator device is attachable to and detachable from the base aggregator unit,
   wherein the portable aggregator device receives the position information and the identification information when detached from the aggregator base unit,
   wherein the portable aggregator unit is operably connected to the aggregator base unit when attached to the aggregator base unit, and transmits the position information and the identification information to the aggregator base unit, and
   wherein the aggregator base unit receives the sensor data and associates the sensor data with the position information.

2. The system of claim 1, wherein the portable aggregator device receives the sensor data when attached to the aggregator base unit and associates the sensor data with the position information.

3. The system of claim 1, wherein the aggregator system is wirelessly connected to the at least one wheel end component.

4. The system of claim 1, wherein the component body is one or more of a brake actuator, a brake adjuster, a hub, a drum, a rotor and a brake caliper.

5. The system of claim 1, further comprising a downstream electronics system operably connected to the aggregator system, the downstream electronics system configured to determine a status of the at least one wheel end component based on the sensor data, wherein the status includes a position of the at least one wheel end component based on the position information.

6. The system of claim 5, wherein the downstream electronic system is a vehicle telematics system.

7. A method of monitoring at least one wheel end component comprising:
 in a commissioning step:
  receiving, in an aggregator system, position information for the at least one wheel end component, from a user interface of the aggregator system;
  receiving, in the aggregator system, identification information for the at least one wheel end component, from the at least one wheel end component; and
  associating, in the aggregator system, the position information with the identification information; and
 in an operating step:
  receiving, in the aggregator system, sensor data output by a sensor assembly of the at least one wheel end component, from the at least one wheel end component;
  associating, in the aggregator system, the sensor data with the position information corresponding to at least one wheel end component from which the sensor data was received; and
  outputting the sensor data together with the associated position information for the at least one wheel end component,
 wherein the aggregator system includes a portable aggregator device and an aggregator base unit, wherein the portable aggregator device is attachable to and detachable from the aggregator base unit,
 wherein the portable aggregator device is detached from the aggregator base unit in the commissioning step and receives the position information and the identification information in the commissioning step,
 wherein the portable aggregator device is attached to the aggregator base unit in the operating step,
 wherein the portable aggregator device receives the sensor data and associates the sensor data with the positioning information in the operating step, and
 wherein the portable aggregator device is operably connected to the aggregator base unit and transmits the position information and the identification information to the aggregator base unit.

8. The method of claim 7, wherein the aggregator base unit receives the sensor data and associates the sensor data with the position information in the operating step.

9. The method of claim 7, wherein the aggregator system is operably connected to a downstream electronics system, the method further comprising:
 determining, at the downstream electronics system, a status of the at least one wheel end component based on the sensor data, wherein the status includes a position of the at least one wheel end component based on the position information.

10. The method of claim 9, wherein the downstream electronics system is a vehicle telematics system.

11. A vehicle comprising:
 a vehicle frame;
 at least one wheel end component operably connected to the vehicle frame, the wheel end component comprising:
  a component body; and
  a sensor assembly configured to:
   detect one or more inputs associated with the component body and output sensor data representative of the detected input; and
   transmit the sensor data; and
 an on-vehicle aggregator system operably connected to the at least one wheel end component and configured to:
  receive position information for the at least one wheel end component from a user interface;
  receive identification information for the at least one wheel end component from the at least one wheel end component;
  associate the position information with the identification information for the at least one wheel end component;
  receive the sensor data from the at least one wheel end component;
  associate the sensor data with the position information for the at least one wheel end component; and
  output the sensor data together with the associated position information for the at least one wheel end component to determine a status of the wheel end component,
 wherein the aggregator system includes a portable aggregator device and a base aggregator unit, wherein the portable aggregator device is attachable to and detachable from the base aggregator unit,
 wherein the portable aggregator device receives the position information and the identification information when detached from the aggregator base unit,
 wherein the portable aggregator unit is operably connected to the aggregator base unit when attached to the aggregator base unit, and transmits the position information and the identification information to the aggregator base unit, and
 wherein the aggregator base unit receives the sensor data and associates the sensor data with the position information.

* * * * *